Inventor
Joseph Bellis
By [signature]
Attorney

Jan. 1, 1935.　　　　　J. BELLIS　　　　　1,986,461
AUTOMOBILE CONTROL MECHANISM
Filed July 18, 1932　　　4 Sheets-Sheet 2
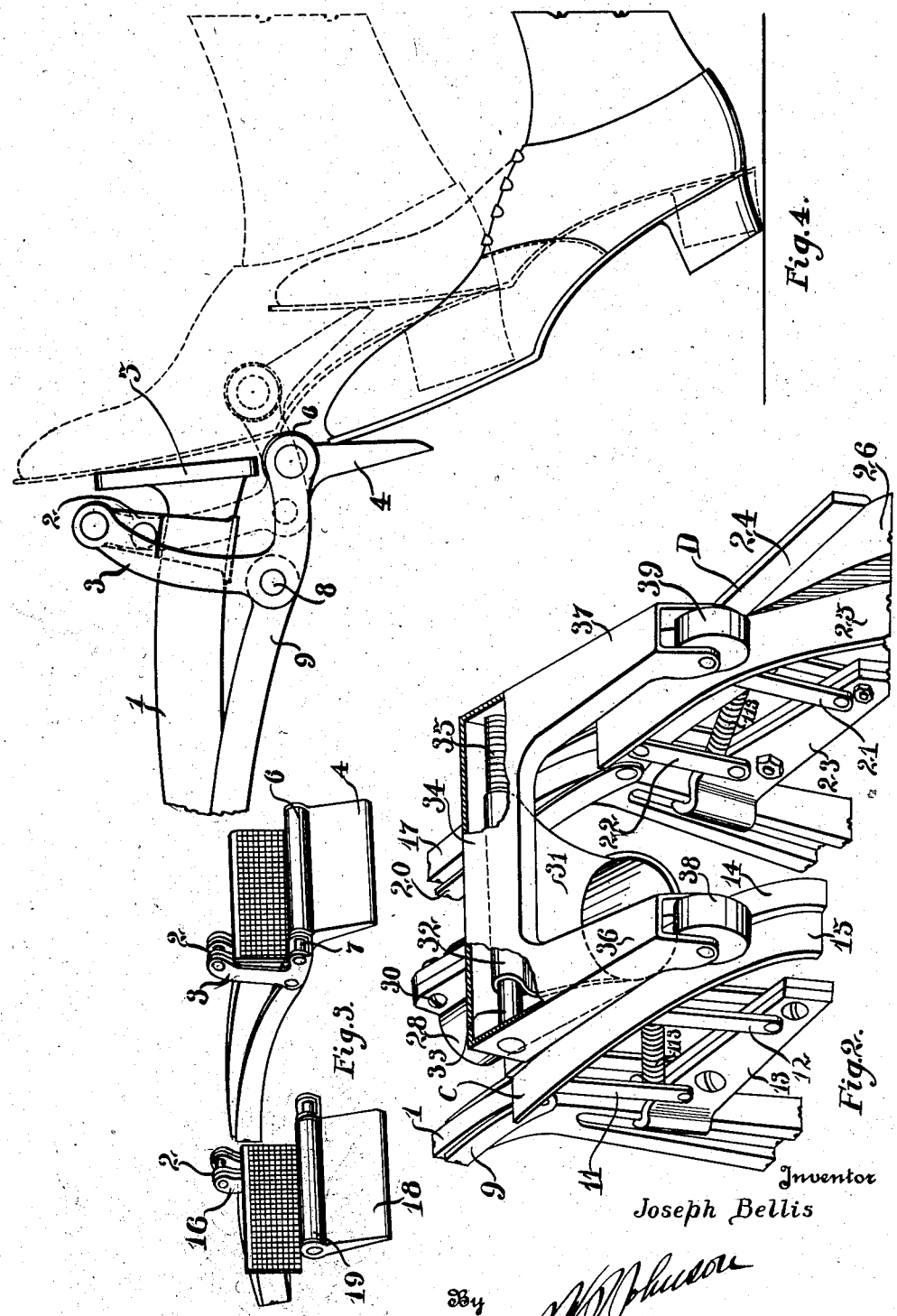

Jan. 1, 1935. J. BELLIS 1,986,461
AUTOMOBILE CONTROL MECHANISM
Filed July 18, 1932 4 Sheets-Sheet 3
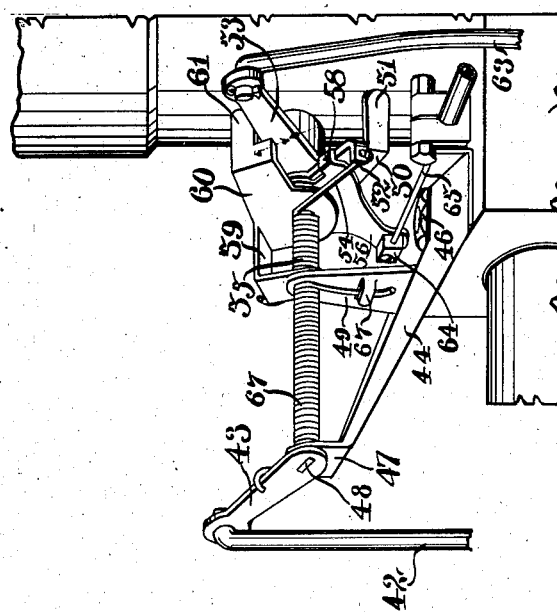
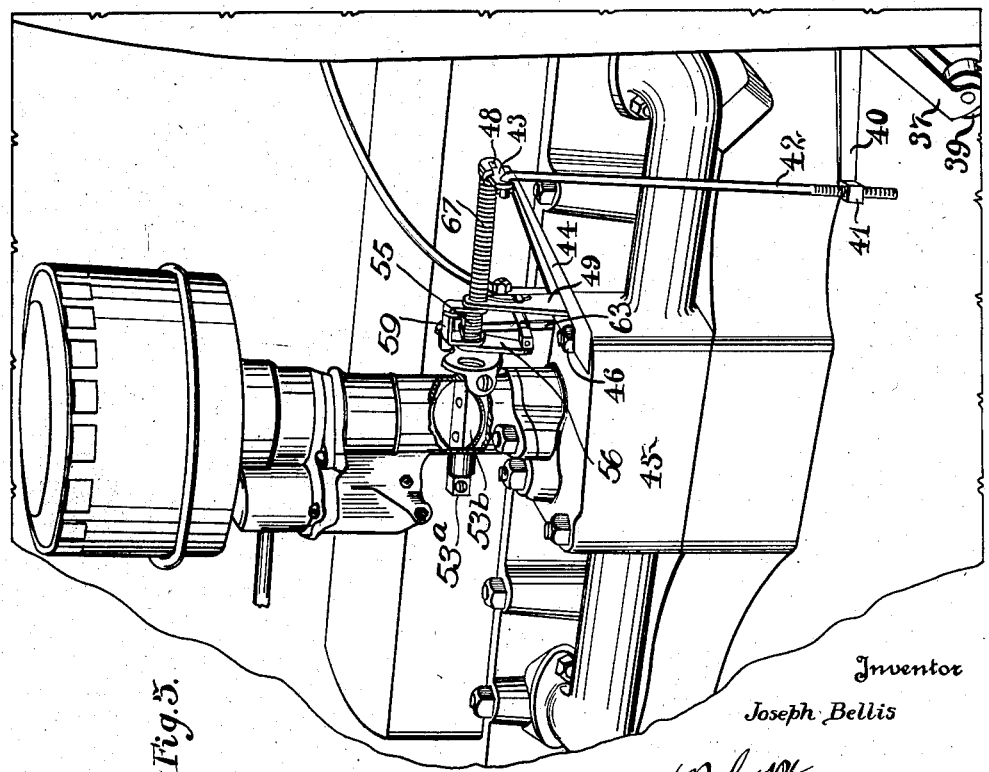
Inventor
Joseph Bellis
By
Attorney Jan. 1, 1935. J. BELLIS 1,986,461
AUTOMOBILE CONTROL MECHANISM
Filed July 18, 1932 4 Sheets-Sheet 4

Inventor
Joseph Bellis
By
Attorney

Patented Jan. 1, 1935

1,986,461

UNITED STATES PATENT OFFICE 1,986,461

AUTOMOBILE CONTROL MECHANISM

Joseph Bellis, St. Paul, Minn., assignor to Bellis Devices Corporation, St. Paul, Minn., a corporation of Minnesota Application July 18, 1932, Serial No. 623,040

8 Claims. (Cl. 192—.01)

The present invention relates to an automobile control mechanism, and more particularly to a mechanism whereby the carburetor regulating means may be adjusted to a set position for normal driving, and having control means associated with the operating pedals of the automobile to close the carburetor during the depression of said pedals.

Devices for controlling carburetor adjustment by means associated with the clutch and brake pedals of an automobile have previously been devised, as shown in my co-pending applications, Serial Number 386,427, filed August 16th, 1929, and Serial Number 486,610, filed October 6th, 1930.

An object of the present invention is to make an improved and simplified carburetor control mechanism for an automobile.

In order to attain this object, there is provided, in accordance with one feature of the invention, a manually controlled device for adjusting the carburetor to a required position for driving, and means actuated by a movement of the driver's foot in operating a foot pedal to close the carburetor prior to the depression of either the clutch or brake pedal of the automobile on which the device is installed, the control mechanism associated with the clutch pedal of the car having means to advance the carburetor adjustment after a depression of the clutch pedal and prior to a complete release thereof so as to open the carburetor to speed up the motor just prior to the engagement of the clutch.

These and other features of the invention will be more fully brought out in the following description and the accompanying drawings, wherein:

Figure 2 is a view in perspective of a carburetor control element with cam members mounted on the brake and clutch pedals, respectively, shown in operative position with respect to said control member.

Figure 3 is a view in perspective of the upper portions of the clutch and brake pedals, respectively, with foot control elements mounted thereon.

Figure 4 is a view in side elevation of a foot pedal with a carburetor control element mounted thereon, the element being shown in depressed position in solid lines, and in released position in dotted lines, a foot of a driver being shown, respectively, in solid lines in position to depress the control member to close the carburetor, in dotted lines showing the foot in position to release the carburetor control, and in dotted lines in raised position above the other two, the foot is shown in position after depression of the carburetor control member and in position to depress the foot pedal.

Figure 5 is a view in perspective of a portion of an automobile motor having the control mechanism mounted thereon.

Figure 6 is an enlarged perspective view of a control mechanism mounted on the throttle valve of the carburetor.

Figures 7, 8, 9, and 10 show the positions of the control mechanism for controlling the throttle valve in various positions of operation.

Figure 9:
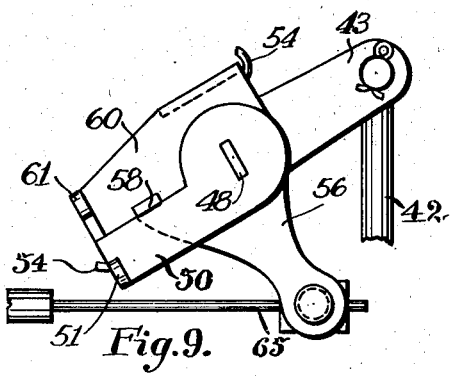
Figure 10:
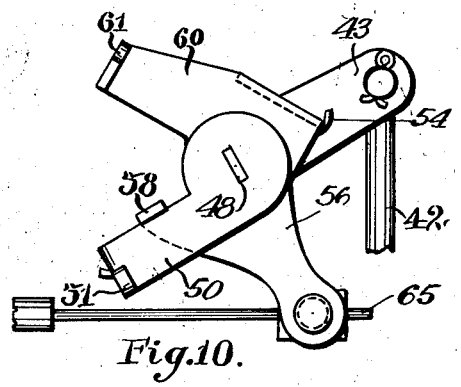
Figure 11:
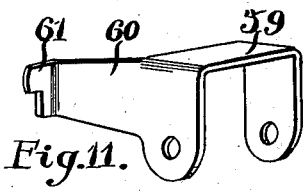
Figures 12, 13:
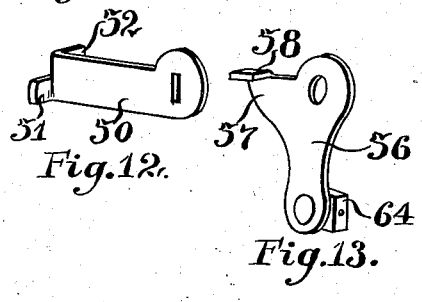
Figure 14:
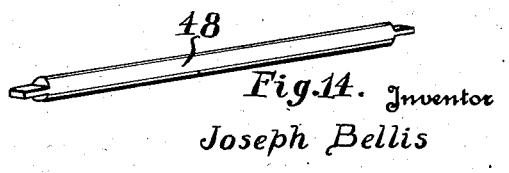

Figures 11, 12, and 13 are views in perspective of lever arms embodied in the construction shown in Figures 7 to 10, inclusive; and Figure 14 is a view in perspective of a rod upon which the lever arms are mounted.

Referring to the drawings in detail, the control mechanism may be considered as comprising two major portions, one the control valve assembly A, mounted on the motor; and the assembly B adjacent the clutch and brake pedals. While here shown as mounted on the clutch and brake pedals, these parts may be adapted for mounting on other convenient portions of the automobile, as will be readily apparent to one skilled in the art.

Considering, first, the assembly B, the automobile brake pedal 1 is provided with an upwardly extending portion 2 near the upper end thereof, to which is pivotally mounted an arm 3. On the lower end of this arm is mounted a foot plate 4 which is normally held in a position slightly above the face 5 of the brake pedal 1, as illustrated in Figure 4. A roller 6 is rotatably mounted on a pin 7 to facilitate movement of the driver's foot across this member. Pivotally connected to the arm 3 as by means of a pin 8 is a link 9 which is pivotally connected at its lower end to a cam member C as by means of a pivot pin 10. This pivotal connection is similar to that by which a link 20 is connected to a second cam member D, to be later described in detail, which pivotal connection is clearly shown in Figure 2.

Figure 1:
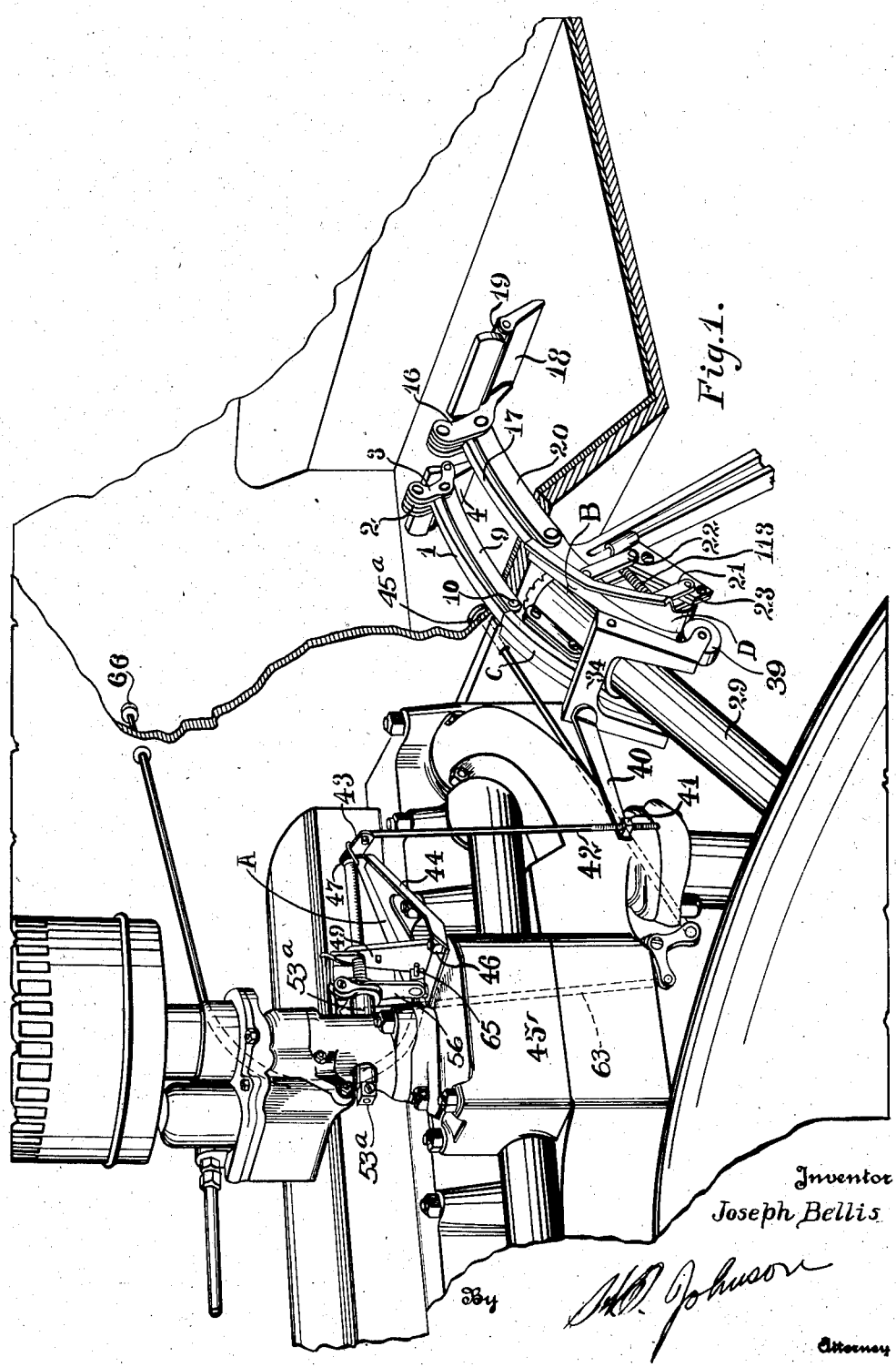
Figure 1 is a view in perspective of an automobile motor having an embodiment of the present invention installed thereon, portions of the automobile not essential to the invention being broken away.

The cam C is pivotally mounted on two pairs of parallel links 11 and 12, the lower ends of said links being pivotally connected to a clamp member 13 which is securely clamped to the brake pedal 1, as best shown in Figure 2. A coil spring 113 normally holds the cam C upwardly, as shown in Figure 1. The cam C has a high side 14 and a low side 15, the purpose of which will be brought out later in the specification.

A lever arm 16 is pivotally mounted on the clutch pedal 17 in the same manner as the arm 3 on the brake pedal 1, and has a foot plate 18 and roller 19 similar to the plate 4 and roller 6 on the brake pedal. A link 20, similar to the link 9, connects the lever arm 16 to a cam D which is pivotally mounted on parallel links 21 and 22 which are pivotally connected at their lower ends to a clamp member 23, which is securely fastened to the clutch pedal 17. The cam member D has the upper portion 25 thereof planiform throughout its width and on the same transverse level as that of the high side 14 of the cam C. The lower portion of the cam surface 25 slopes downwardly from the level of the upper portion thereof, as best shown in Figure 2. A step portion 26, having the top surface thereof at the same transverse level as the upper portion of the surface 25, is disposed to the driver's left hand side from the surface 25. This portion 26 is triangularly shaped on its top surface, as clearly shown in Figure 2. A flange 24 extends along the driver's left hand side of the triangular step portion 26 and the surface 25 above the step portion so that when the cam D is depressed the flange 24 acts as a lateral cam to force the roller 39 and with it the yoke 34 to the driver's right onto the surface 25. On releasing the cam D after depressing it sufficiently to force the roller 39 over onto the surface 25, the roller 39 will be guided by the side of the step 26 straight along the surface 25 onto the depressed portion at the lower end thereof. When both the cams C and D are in the fully released position they will clear the rollers 38 and 39 and the spring 35 will move the yoke 34 to the driver's left to its normal position. A spring 113 mounted below the cam D normally holds the cam D upwardly in the position shown in Figure 1.

A split collar 28 surrounds the steering column 29 of the automobile on which the apparatus is mounted, and is held in position by bolts 30 which clamp the collar 28 firmly on the steering column. Extending upwardly from the collar 28 is a plate 31, the upper end of which is bent into the form of a circular sleeve 32 which is slidably mounted on a pin 33 (see Figure 2). This pin 33 is rigidly secured at its ends to a yoke 34 and a coil spring 35 is held in compression between the right hand side of the yoke, as seen in Figure 2, and the right hand end of the sleeve 32. This normally holds the yoke in the right hand position shown in Figure 2.

The yoke 34 is provided with forwardly extending arms 36 and 37 in the outer or free end of each of which are mounted rollers 38 and 39, respectively. These rollers are positioned to normally clear the cams C and D when the cams are in a fully raised position, thereby freeing the yoke 34 for movement to the driver's left after a displacement of said yoke to the right during a depression of cam D as will be brought out later herein. An arm 40 (see Figure 1) is rigidly and securely connected to the yoke 34 and has a threaded lug 41 pivotally mounted in the outer or free end thereof. In this lug is threadedly mounted a rod 42, the upper end of which is offset at right angles to the main portion of the rod and extends through an opening in an arm 43. This arm 43 comprises a portion of the assembly A, and the assembly A will now be described in detail.

A bracket 44 is fixedly secured on an air heating chamber 45 by means of nuts 46, which are the nuts used to hold the air heating chamber assembly in position. The bracket 44 has an upwardly extending portion 47 at the outer end thereof in which is pivotally mounted a rod 48. The bracket 44 also has an upwardly extending portion 49, formed by stamping out a portion of the metal of the bracket itself and bending it upwardly to assume a vertical position when the bracket is mounted on the car. The rod 48 is also pivotally mounted in an opening in this upwardly extending portion.

To the outer end of the rod 48 is fixedly connected the lever arm 43, while to the inner end of the rod 48 is fixedly connected a lever arm 50. This lever arm 50 has two oppositely disposed offset portions 51 and 52 at the outer end thereof, the portion 51 being adapted to engage a throttle lever 53, of a throttle valve 53b, see Figure 5 and the other portion 52 being adapted to receive the end 54 of a coil spring 55. The throttle lever 53 is fixedly secured to the shaft 53a of the carburetor control valve, in a customary manner. The valve shaft 53a and the rod 48 are in co-axial alinement but are not connected together and are free to turn separately except for the action of the arms 50 and 60 on the throttle lever 53. Mounted inwardly of the lever arm 50 to pivot freely on the rod 48 is an arm 56 having an outwardly extending portion 57 with laterally offset lip 58 to engage the lever arm 50. A yoke member 59 is also mounted to pivot freely on the rod 48 and has an outwardly extending portion 60 with a laterally offset portion 61 to engage the throttle lever 53. The other end of the coil spring 55 from that engaging the offset 52, is hooked over the yoke 59. This arrangement tends to resiliently force the arm 50 and the offset portion 60 of the yoke member 59 toward each other.

A rod 63 is connected from the throttle lever 53 to the foot throttle of the automobile in a well known manner. A lug 64 is pivotally mounted on the lower end of the lever arm 56 and is connected by means of a Bowden wire 65 to a hand throttle 66, see Figure 1. A coil spring 67 encircles the rod 48 between the upwardly extending portions 47 and 49, one end of this coil spring being hooked over the arm 43, the other end being hooked under a lip 67 which is here shown as being formed integrally with the upwardly extending portion 49.

This tends to normally force the lever arm 43 in a counter-clockwise direction from the position shown in Figure 6, forcing the outer end of the lever arm 43 downwardly.

Figure 7:
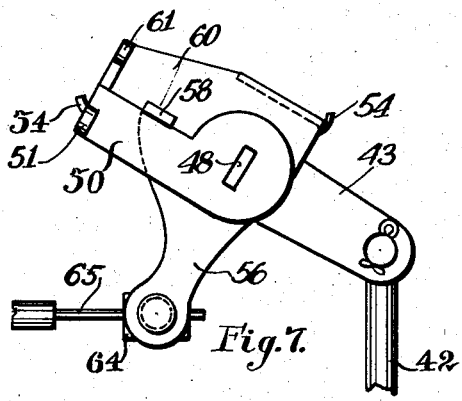
Figure 8:
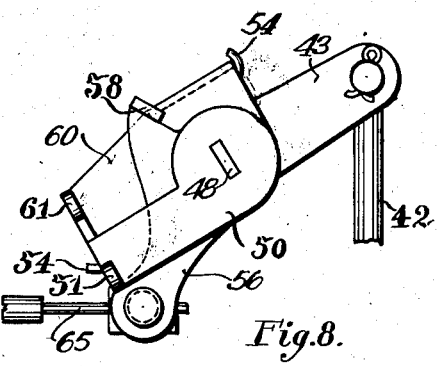

In the detail sketches on sheet 4, of the drawings, Figure 7 shows the member 56 in the position it occupies when the hand throttle 66 is adjusted to a position to partially open the throttle and the remaining parts of the control mechanism in the positions occupied when the brake and foot pedals are in normal position and the foot throttle released. Figure 8 shows the relative positions of the parts of the control mechanism A when the hand throttle is in the same position as in Figure 7, and either the plate 4 or plate 18 is depressed to close the throttle. Figure 9 shows the relative positions of the parts of the control mechanism A when the hand throttle and foot throttle are both in closed position. Figure 10 shows the relative positions of the parts of the control mechanism A when the hand throttle is in closed position with either the plate 4 or plate 18 depressed and the independent foot control pedal 45a (see Figure 1) released and the plate 4 or 18 depressed, but with the independent foot control pedal 45a actuated to open the carburetor valve, as shown in Figure 6.

The operation of the device is as follows:

The present mechanism is illustrated as being mounted on a car which is not particularly designed for the mounting of the present device, and the various parts of the present mechanism are, therefore, designed to be attached to the various parts of the automobile as an accessory, although it is contemplated, and would be desirable, to build the various mechanisms into an automobile at the factory. If this were done, of course, it would be apparent to an ordinary skilled mechanic in this art that various structural changes would be necessary and certain parts here shown as being removably clamped in position would be built in as a unitary part of the automobile. Such modifications would be within the scope of an ordinary mechanic, and it is, therefore, believed unnecessary to show such modifications in detail here, as it would unduly complicate the drawings.

Considering, first, the cam and lever assemblies associated with the brake pedal 1 and clutch pedal 17, the clamp 2 is secured around the brake pedal 1 near the upper end thereof, and the links 9 extend along the pedal. If necessary, the openings for the brake and clutch pedals are cut out so as to permit free longitudinal movement of the links 9. Normally the cams C and D are raised upwardly by the springs (not shown), which normally hold the pedals 1 and 17 in an upward position in a customary manner, and by the springs 113 associated with each of the cams C and D. In this position the cams C and D clear the rollers 38 and 39, permitting the spring 35 to hold the yoke 34 toward the driver's left hand side, thereby aligning the high side 26 of the cam C with the roller 39 and the high side 14 of the cam D with the roller 38. The parallel links 11 and 12 permit longitudinal rocking movement of the cam C so that upon depression of the plate 4 the cam C will be forced downwardly to engage the roller 38, which rolls up onto the high side 14 of the cam C, rotatively moving the yoke member 34 clockwise from the position shown in Figure 1. This action raises the rod 42 and moves the outer, or free end, of the arm 43 upwardly. The rod 48 rotates with the arm 43, as does also the arm 50 on the opposite or inner end of the rod 48. Normally, this carries the yoke member 59 with it, by means of the tension of the coil spring 55, as shown in Figure 8, to close the throttle.

In Figure 6 the parts are shown in the position they occupy when the hand throttle 66 is in a closed position and the foot throttle is depressed to move the throttle lever 53 upwardly to an open position which forces the arm 60 on the yoke member 59 to separate from the arm 50 against the resilient pressure of the coil spring 55. Closing the hand throttle causes the offset portion 58 to engage the arm 50 and move it downwardly, as shown in Figure 6. This rotates the rod 48 and raises the outer end of the arm 43, which, being connected by the rod 42 to the yoke 34, raises the yoke to the position it occupies when the rollers 38 or 39 are on the high portions of the cams C or D, respectively.

Assuming that the hand throttle is open to a point where the car will run at about forty-five miles an hour on the road on which it is being driven, the parts will be approximately in the position shown in Figure 7.

If it is desired to slow down momentarily, the driver depresses either the foot plate 4 or 18, as shown in solid lines in Figure 4, which moves the cam C or D connected thereto forwardly, without disturbing the brake or clutch pedal, raising the lower free end of the yoke, and moving the arm 43 upwardly, thereby bringing the parts of the assembly A to the position shown in Figure 8. This action moves the throttle lever 53 to the closed position, but leaves the arm 56 in adjusted position so that when the driver's foot is removed from the foot plate 4 or 18, the spring 113 will raise the cam C or D upwardly to clear the roller 38 or 39, whereupon the spring 67 will move the arm 50 upwardly into contact with the stop 58 on the arm 56 and since the arm 50 by means of the lug 51 moves the throttle arm 53 upwardly with it, the throttle arm is thus released to its adjusted position.

If it is desired to stop the car, the clutch pedal 1 and brake pedal 17 are depressed, the hand throttle 66 being left in adjusted position. The movement of the driver's foot to depress the clutch and brake pedals, first engages the plates 4 and 18, and depresses these plates to close the throttle valve. Depression of the plate 18 causes the yoke 34 to be moved toward the driver's right hand side, as shown in Figure 2, by the side flange 24 of the cam D. This moves the roller 38 over the low side 15 of the cam C. On return of the clutch pedal 17 to a normal position, the roller 39 passes straight along the cam D onto the depressed lower portion 25 of the cam D and does not ride along the step 26 on the return movement of the clutch pedal. This causes the rollers 38 and 39 to be in a lower position at the time the clutch engages, and just prior thereto, than they were when the clutch was released, since at that time the roller 39 was on the cam step 26 and the roller 38 was on the high side 14 of the cam C. This causes the throttle lever 53 to be moved to a slightly open position just prior to the engagement of the clutch, thereby speeding up the motor and preventing stalling of the motor.

When the clutch and brake pedals return to normal positions, the cams C and D clear the rollers 38 and 39 and the coil spring 35 forces the yoke over to its normal position. It is to be understood that the words "hand throttle", as used in the specification and claims, is intended to include any separately adjustable throttle.

In starting a car which has been stopped on a hill, headed toward the top of the hill, it is necessary to accelerate the motor just prior to engaging the clutch, and to release the brake simultaneously with the engagement of the clutch. With the conventional type of carburetor control this is recognized as a rather difficult procedure and frequently results in stalling of the motor, due to improper co-ordination on the part of the driver. With an automobile having a control mechanism embodying my present invention, and assuming that the clutch pedal 17 and brake pedal 1 are both fully depressed and the hand throttle 66 is in open adjusted position, the parts of the mechanism A would be in the position shown in Figure 8, and the yoke 34 would have been moved to the driver's right by the flange 24 upon depressing the clutch pedal 17 so as to bring the roller 39 in alinement with the low portion 25 of the cam D, and to bring the roller 38 over the low side 15 of the cam C, but raised therefrom, since the upper portion of the surface 25 upon which the roller 39 rides when the clutch pedal is fully depressed is at the same transverse level as the high side 14 of the cam C. By releasing the clutch and brake pedals 1 and 17 simultaneously, the roller 39 will ride onto the low portion 25 of the cam D at the lower end thereof prior to the engagement of the clutch, thereby permitting the yoke 34 to move clockwise from the position shown in Figure 2, to accelerate the motor. Upon completely releasing the clutch and brake pedals and the plates 4 and 18, the cams C and D will be moved upwardly to the fully released position shown in Figure 1, with the rollers 38 and 39 clear of the cams C and D, respectively, thereby permitting the spring 35 to move the yoke 34 to the driver's left to a normal position. During this clutch and brake releasing operation, if the release of the brake should be inadvertently delayed until after the clutch was engaged, the throttle would nevertheless be advanced prior to the engagement of the clutch, since the roller 38, being over the low side 15 of the cam C and spaced upwardly therefrom, as above described, would permit a clockwise pivotal movement of the yoke 34 from the position shown in Figure 2, until the roller 38 engaged the low side 15 of the cam C to advance the throttle.

The device is simple and positive in operation, can readily be installed on any normal type of car, and greatly simplifies driving. Furthermore, it entirely eliminates brake and clutch slipping by the driver "riding" the pedals while driving, since the throttle will be closed by the actions of the cams C and D, as above set forth before either the clutch or brake pedal can be depressed sufficiently to either release the clutch or to apply the brake.

I claim:

1. In a carburetor control mechanism for an automobile, having a control pedal, a foot throttle, a separately adjustable hand throttle, and a carburetor control valve operatively connected thereto; means urging said control valve to an open position, independently movable pedal means positioned adjacent said control pedal, cam means associated with said independently movable pedal means to be actuated by a depression of said independently movable pedal means to close said valve, and means engaging said control valve and movable upon a depression of said foot throttle to open said valve but to leave said hand throttle in adjusted position.

2. In a carburetor control mechanism for an automobile having a clutch and brake pedal, a foot throttle and a separately adjustable throttle, a carburetor control valve operatively connected to said foot throttle and to said separately adjustable throttle, cam means associated with said brake and clutch pedals and movable independently thereof, means operatively connected to said control valve and actuated by a movement of said cam means independently of a movement of said clutch and brake pedals to close said valve, and offset means actuated by a depression of said cam means to relatively advance the position of said valve on a return movement of said cam means.

3. In a carburetor control mechanism for an automobile having a clutch and brake pedal, a foot throttle, and a separately adjustable hand throttle; a carburetor control valve and a control valve operating member valve operating means operatively connected to said control valve and to said foot throttle, a pair of lever arms adapted to operate said control valve operating member, spring means urging said lever arms toward each other to engage opposite sides of said control valve operating member, an arm pivotally mounted to have a portion thereof adapted to engage one of said lever arms, said pivoted arm being connected to said separately adjustable throttle to move said control valve to an adjusted position, and cam means actuated by a foot movement toward said pedals to operate one of said lever arms to close said control valve prior to an actuation of said pedals, but to leave said hand throttle in an adjusted position.

4. In a carburetor control mechanism for an automobile having a foot throttle, a separately adjustable hand throttle, a carburetor control valve connected to said foot throttle, means normally urging said control valve to an open position, cam means connected to a foot pedal, said cam means having operative engagement with said control valve to close said control valve on a depression of said cam means, said cam means having an offset portion to relatively advance the position of said control valve on a return movement of said foot pedal, means normally holding said control valve to an adjusted position and independently movable by said foot throttle to open said control valve on a depression of said foot throttle but to leave said hand throttle in adjusted position.

5. In a carburetor control mechanism for an automobile having a foot throttle, a separately adjustable hand throttle, a carburetor control valve and a control valve operating member operatively connected to said foot throttle, a pair of spring-held arms mounted to contact opposite sides of said control valve operating member, cam actuated means mounted to operate one of said spring-held arms to close said control valve upon an operative movement of said cam means, means connecting said hand throttle to one of said spring-held arms to move said control valve to an adjusted position, the other of said spring-held arms being displaceable against the pressure of said spring-held arm upon a depression of said foot throttle to open said control valve.

6. In a carburetor control system for an automobile having a control pedal, a foot throttle, a separately adjustable throttle, and a carburetor control valve; a cam mounted to be movable independently of said control pedal, spring means mounted to normally hold said cam in an inoperative position, cam control means mounted to extend beyond said control pedal, cam actuated means to be actuated by a depression of said cam, and operatively connected to said control valve to close said valve but to leave said separately adjustable throttle in adjusted position, and spring-held means movable by a depression of said foot throttle to open said valve against the action of said cam.

7. In a carburetor control mechanism for an automobile, having clutch and brake pedal, a foot throttle and a separately adjustable hand throttle, a carburetor control valve a valve operating member connected to said control valve and to said foot throttle, a bracket mounted adjacent said control valve and having a pair of lever arms adapted to engage said control valve operating member, spring means urging said lever arms toward each other to engage opposite sides of said control valve operating member, an arm pivotally mounted to have a portion thereof adapted to engage one of said lever arms, said pivoted arm being connected to said hand throttle to move said throttle to an adjusted position, cam means actuated by a foot movement to operate one of said lever arms to close said control valve but to leave said hand throttle in an adjusted position, said pair of lever arms engaging said control valve operating member being adapted to separate on a depression of said foot throttle to leave said separately adjustable throttle in an adjusted position.

8. In a carburetor control mechanism for an automobile, having a control pedal, a foot throttle, a separately adjustable hand throttle, and a carburetor control valve operatively connected thereto; means urging said control valve to an open position, independently movable pedal means positioned adjacent said control pedal, means associated with said independently movable pedal means to be actuated by a depression of said independently movable pedal means to close said valve, and means engaging said control valve and movable upon a depression of said foot throttle to open said valve but to leave said hand throttle in adjusted position.

JOSEPH BELLIS.